United States Patent [19]
Kraft et al.

[11] Patent Number: 4,760,103
[45] Date of Patent: Jul. 26, 1988

[54] NONSKID COATING FORMULATIONS

[75] Inventors: Larry W. Kraft, Baltimore; Robert F. Brady, Jr., Gaithersburg, both of Md.

[73] Assignee: The United States of America as represented by the Secretary of the Navy, Washington, D.C.

[21] Appl. No.: 821,308

[22] Filed: Jan. 22, 1986

[51] Int. Cl.$^4$ .................. C08K 3/08; C08K 3/22; C08K 5/01; C08L 63/02
[52] U.S. Cl. .................. 523/150; 523/427; 523/428; 523/457; 523/458
[58] Field of Search ............... 523/428, 457, 150, 458, 523/466, 468, 463, 427; 404/19, 20, 21

[56] References Cited

U.S. PATENT DOCUMENTS

| | | |
|---|---|---|
| 2,706,936 | 4/1955 | Willson, Jr. ............. 404/21 |
| 3,227,604 | 1/1966 | Morgan ................. 404/20 |
| 3,308,725 | 3/1967 | Nagin et al. ............ 404/20 |
| 3,855,444 | 12/1974 | Palena ................. 404/19 |
| 4,599,885 | 4/1986 | Domeier et al. .......... 523/457 |

Primary Examiner—Allan M. Lieberman
Attorney, Agent, or Firm—Thomas E. McDonnell; Andrew M. Lesniak

[57] ABSTRACT

A nonskid coating formulation comprising, by weight, 3 to 8% amine resins, 7 to 13% epoxy resins, 17 to 22% pigments, fillers, and thickeners, 10 to 20% solvents and 39 to 56% aggregates.

19 Claims, No Drawings

NONSKID COATING FORMULATIONS

BACKGROUND OF THE INVENTION

This invention relates to nonskid coatings for surfaces and more particularly to formulations for such coatings.

Among other uses, nonskid coatings are employed on the flight and hangar decks of aircraft carriers and on helipads of air-capable ships to provide traction to men, equipment, and aircraft. Current coatings are damaged by impact, and fragments are created which damage aircraft turbine engines.

Multicomponent nonskid coating formulations used heretofore are deemed largely unsatisfactory for present day applications and, in general, have not met all of the requirements that have recently been imposed due to greater weight and speed of aircraft.

Several of the many formulations in the prior art are discussed in the article "Tougher Deck Coating made for Navy Carriers", published in the Aug. 1, 1983 issue of Chemical and Engineering News. Two component epoxy polyamide formulations pigmented with titanium dioxide, carbon black, and talc, and having naphtha and/or ethylene glycol monoethyl ether as solvent are reported in this article. These formulations outperformed conventional products yet did not meet current requirements for wear or service life.

SUMMARY OF THE INVENTION

It is therefore an object of the present invention to provide improved nonskid coating formulations having enhanced impact resistance and resistance to sliding movement thereon by aircraft or other equipment.

It is a further object of the invention to provide nonskid coatings which will maintain their adhesion to primed steel after severe impact and thus eliminate the hazards caused by dislodged fragments. Yet another object of the invention is to provide nonskid coatings which are resistant to wear and which provide resistance to sliding throughout their service life by virtue of their coarse textured surface.

The nonskid coating formulations of the present invention are comprised of two or more components that contain specified ingredients in specified amounts. A first component may be comprised of up to four ingredients: a resin, selected from the amidoamine resins or the adducted polyamide amine resins or any combination of these; a pigment, selected from talc, fiber fillers, titanium dioxide, carbon black, thickeners, or any combination of these; a solvent selected from butanol, naphtha, or any combination of these; and a coarse aggregate selected from various powders, such as aluminum, aluminum oxide, garnet, glass beads, or any combination of these. A second component may be comprised of up to four ingredients; a resin, selected from solid or liquid epoxy resins; elastomer-modified epoxy resins, or any combination of these; a pigment, selected from talc, fiber filler, titanium dioxide, carbon black, thickeners, or any combination of these; a solvent, selected from naphtha, xylene, propylene glycol monomethyl ether, or any combination of these; and a coarse aggregate, selected from various powders, such as aluminum, aluminum oxide, garnet, glass beads, or any combination of these.

DETAILED DESCRIPTION OF THE PREFERRED EMBODIMENT

This invention relates to nonskid coating formulations that impart both practical and optimal properties to the resultant nonskid coating. Typical formulations by weight include specific percentages of amine resins, epoxy resins, pigments, fillers, thickeners, solvents, and aggregates. Such formulations typically are, but need not be, two component systems.

Any nonskid coating formulation comprising by weight about 3 to 8% amine resins; about 7 to 13% epoxy resins; about 17 to 22% pigments; about 10 to 20% solvents; and about 30 to 55% coarse aggregates is within the broad ambit of the present invention.

Three different formulations within the stated ranges are set forth hereinbelow as being ones that provide optimal results, in terms of durability, efficacy and other reasons.

Typical formulations comprises two components A and B which are manufactured separately and mixed together shortly before application. The preferred way to use these formulations involves mixing the constituents of the two components in specified proportions by weight.

The following three formulations best exemplify the present invention. Although detinite amounts of each ingredient are provided the coatings are useful throughout the ranges provided for each ingredient as indicated in the parenthetical information.

FORMULA NO. 1

| Component A | |
|---|---|
| Amidoamine resin (e.g., Genamid 2000 by Henkel) | 0.4% (0.3 to 0.6%) |
| adducted polyamide amine resin solution (e.g., Versamid 280B75 by Henkel) | 5.7% (5.0 to 7.0%) |
| Component B | |
| Liquid Epoxy resin (e.g., Epon 828 by Shell) | 13.0% (11.0 to 15.0%) |
| Thickening agent (e.g., Thixatrol ST by NL Industries) | 0.4% (0.3 to 0.7%) |
| Talc (e.g., MP 30-36 by Pfizer) | 18.1% (15.0 to 19.0%) |
| Fiber filler (e.g., Pulpex by Hercules) | 0.4% (0.0 to 2.0%) |
| Titanium dioxide (e.g., TiPure R-960 by duPont) | 0.7% (0.2 to 1.8%) |
| Carbon black (e.g., Federal Specification TT-P-350) | 0.5% (5.0 to 11.0%) |
| Naphtha (e.g., Amsco-SHFN by Union Chemicals) | 5.4% (0.5 to 6.4%) |
| Propylene glycol monomethyl ether (e.g., Arcosolve PM by Arco Chemical Company) | 5.4% (0.5 to 6.4%) |
| Aluminum metal aggregate (e.g., LSA-284 by Reynolds) | 50.0% (30.0 to 55.0%) |

The preferred means of manufacturing a nonskid coating from Formula No. 1 is as follows:

Component A is made by stirring the amidoamine and the adducted polyamide amine resin solution together by hand until they are mixed throughly.

Component B is made by stirring the liquid epoxy resin, naphtha, propylene glycol monomethyl ether, and thickener together on a Cowles disperser. The talc, titanium dioxide, and carbon black are added in portions to ensure through mixing, and mixing is continued for 15 minutes after a temperature of 120 degrees Fahrenheit is attained. The fiber filler is then added and mixed thoroughly. At that time, mechanical stirring is concluded and the aluminum metal aggregate is added and mixed by hand.

A nonskid coating is made by stirring together all of component A and all of component B just prior to application.

FORMULA NO. 2

| Component A | | |
|---|---|---|
| Amidoamine resin (e.g., Genamid 2000 by Henkel) | 0.4% | (0.3 to 0.6%) |
| adducted polyamide amine resin solution (e.g., Versamid 280B75 by Henkel) | 5.7% | (5.0 to 7.0%) |
| Component B | | |
| Epoxy resin (e.g., Epon 828 by Shell) | 13.0% | (11.0 to 15.0%) |
| Thickening agent (e.g., Thixatrol ST by NL Industries) | 0.4% | (0.3 to 0.7%) |
| Talc (e.g., MP 30-36 by Phfizer) | 18.1% | (15.0 to 19.0%) |
| Fiber filler (e.g., Pulpex by Hercules) | 0.4% | (0.3 to 0.5%) |
| Titanium dioxide (e.g., TiPure R-960 by duPont) | 0.7% | (0.3 to 2.0%) |
| Carbon black (e.g., Federal Specification TT-P-350) | 0.5% | (0.2 to 1.8%) |
| Xylene | 10.8% | (5.0 to 11.0%) |
| Aluminum oxide aggregate (e.g., Number 25 by King and Malcolm Co., Inc.) | 50.0% | (30.0 to 55.0%) |

The preferred means of manufacturing a nonskid coating from formula No. 2 is as follows:

Component A is made by stirring the amidoamine and the adducted polyamide amine resin solution together by hand until they are mixed thoroughly.

Component B is made by dispersing the liquid epoxy resin, xylene, and thickening agent together on a Cowles Dissolver. The talc, titanium dioxide, and carbon black are added in portions to ensure through mixing, and dispersing is continued for 15 minutes after a temperature of 120 degrees Fahrenheit is attained. The fiber filler is then added and mixed thoroughly. At that time, mechanical stirring is concluded and the aluminum oxide aggregate is added and mixed by hand.

A nonskid coating is made by stirring together all of component A and all of component B just prior to application.

FORMULA NO. 3

| Component A | | |
|---|---|---|
| Amidoamine resin (e.g., Genamid 2000 by Henkel) | 0.5% | (0.3 to 0.6%) |
| adducted polyamde amine resin solution (e.g., Versamid 280B75 by Henkel) | 7.1% | (5.0 to 8.0%) |
| Thickening agent (e.g., Bentone SD-2 by NL Industries) | 0.4% | (0.2 to 1.1%) |
| Talc (e.g., MP 30-36 by Pfizer) | 7.5% | (6.5 to 8.5%) |
| Titanium dioxide (e.g., TiPure R-960 by duPont) | 0.2% | (0.1 to 1.0%) |
| Carbon black (e.g., Federal Specification TT-P-350) | 0.2% | (0.1 to 0.9%) |
| Naphtha (e.g., Amsco-SHFN by Union Chemicals) | 5.6% | (2.5 to 6.0%) |
| Component B | | |
| Liquid epoxy resin (e.g., Epon 828 by Shell) | 8.4% | (6.8 to 9.2%) |
| Elastomer-modified epoxy resin (e.g., Kelpoxy G293-100 by Spencer-Kellogg) | 0.8% | (0.7 to 2.4%) |
| Thickening agent (e.g., Benton SD-2 by NL Industries) | 0.7% | (0.4 to 1.1%) |
| Talc (e.g., MP 30-36 by Pfizer) | 9.9% | (8.5 to 10.5%) |
| Titanium dioxide (e.g., TiPure R-960 by duPont) | 0.3% | (0.2 to 1.0%) |
| Carbon black (e.g., Federal Specification TT-P-350) | 0.2% | (0.1 to 0.9%) |
| Naphtha (e.g., Amsco-SHFN by Union Chemicals) | 10.7% | (2.5 to 11.0%) |
| Aluminum oxide aggregate (e.g., Number 25 by King and Malcolm Co., Inc.) | 4.7% | (3.0 to 7.0%) |
| Garnet aggregate (e.g., 24 RT Garnet Grain by Barton Mines Corp.) | 42.8% | (23.0 to 52.0) |

The preferred means of manufacturing a nonskid coating from Formula No. 3 is as follows:

Component A is made by stirring the amidoamine, the adducted polyamide amine resin solution, and the naphtha together until they are mixed thoroughly. The talc, titanium dioxide, and carbon black are added in portions while the mixture is dispersed on a Cowles Dissolver. The thickening agent is then added in portions and dispersion is continued until the mixture is uniform.

Component B is made by stirring the liquid epoxy resin and part of the naphtha together on a Cowles disperser. Part of the talc, titanium dioxide, and carbon black are added in portions and dispersed thoroughly. Part of the thickening agent is then added in portions and dispersed thoroughly. In a separate container, the elastomer modified epoxy resin and part of the naphtha are stirred together on a Cowles disperser. The remainder of the talc, titanium dioxide, and carbon black are added in portions and dispersed as before. The remainder of the thickening agent is added and dispersed thoroughly. The two containers of pigmented resin are then mixed together until uniform. At that time, mechanical stirring is concluded and the aluminum oxide aggregate and the garnet aggregate are added and mixed by hand.

The nonskid coating is made by stirring together all of component A and all of component B just prior to application.

The following information identifies the chemical nature of each ingredient used in the above described formulations for nonskid coatings to the extent revealed by the manufacturer in his normal commercial literature.

The amidoamine resin (e.g., Genamid 2000 by Henkel) is a clear, honey-color liquid with moderately low viscosity. It is manufactured by reacting a mixture of unsaturated fatty acids (containing, e.g., linoleic acid) with a polyamine (e.g., triethylene tetraamine). Typical properties are: amine value (milligrams of potassium hydroxide per gram), 580-620; Brookfield viscosity (poise), 10-25; maximum color (Gardner), 10; and percent resinous material, 100.

The polyamide/epoxy adduct resin solution (e.g., Versamid 280B75 by Henkel) is a dark orange liquid. It is manufactured in three steps: Dimerized fatty acids are reacted with polyamines to form polyamides; this product is reacted with the diglycidyl ether of bisphenol A (see below) to form an adduct; this adduct is then dissolved in n-butyl alcohol to form a solution which is 75 percent by weight of adduct. Typical properties are: amine value (milligrams of potassium hydroxide per gram), 240-260; Brookfield viscosity (poise), 15-30; maximum color (Gardner), 10; and percent resinous material, 74-76.

The liquid epoxy resin (e.g., Epon 828 by Shell) is a commercial grade of the diglycidyl ether of bisphenol A. It is manufactured by the reaction of bisphenol A, epichlorohydrin, and sodium hydroxide. Typical properties are: epoxide equivalent weight (grams), 180–195; Kinematic viscosity (poise), 110–150, maximum color (Gardner) 3; and density (pounds per gallon), 9.7.

The thickening agent (e.g., Thixatrol ST by NL Industries, successor to Baker Thixotropes) is a powdered organic derivative of castor oil designed for aliphatic and aromatic solvent based paints. Typical properties are: density (pounds per gallon), 8.47; and percent nonvolatile material, 100.

The talc (e.g., MP 30-36 by Pfizer) is a natural mineral mined in Montana. It may be described chemically as one of the crystalline forms of magnesium silicate. Typical properties are: density (grams per cubic centimeter), 2.70; fineness of grid (Hegman), 5.0; and oil absorption (pounds of oil per 100 pounds of talc), 36.

The fiber filler (e.g., Pulpex by Hercules) is composed of fibrils of polypropylene which are short in length and high in surface area. Typical properties are: density (grams per cubic centimeter), 0.90; melting point (degrees Celsius), 165; average fiber length (millimeters), 0.8–1.5; and fiber diameter (micrometers), 20–40.

The titanium dioxide (e.g., Ti-Pure R-960 by DuPont) is a fine, dry, white powder which contains a minimum of 89 percent of titanium dioxide. Other ingredients include aluminum oxide and silicon dioxide. Typical properties are: density (grams per cubic centimeter), 3.9; percent volatile material, 0.5; and oil absorption (pounds of oil per 100 pounds of titanium dioxide), 17.

The carbon black (e.g., lampblack corresponding to federal specification TT-P-350A), is almost pure carbon, and is manufactured by burning natural gas in such a manner as to form a deposit of carbon. Typical properties are: density (grams per cubic centimeter), 1.81; oil absorption (pounds of oil per 100 pounds of carbon black), 73; and maximum ash content (percent), 0.5.

The naphtha (e.g., Amsco super high flash naphtha (SHFN) by Union Chemical) is a mixture of aromatic hydrocarbons containing nine and ten carbon atoms. It is a colorless, flammable, liquid. Typical properties are: density (grams per cubic centimeter), 0.875; distillation range (degrees Fahrenheit), 318–350; aniline cloud point (degrees Fahrenheit), 56; and flash point (degrees Fahrenheit in the Tag closed cup), 113.

The propylene glycol monomethyl ether (e.g., Arcosolve PM by Arco Chemical Company) is a colorless, flammable liquid. Typical properties are: density (grams per cubic centimeter), 0.918–0.921; distillation range (degrees Fahrenheit), 243–257; flash point (degrees Fahrenheit in the Tag closed cup), 89; and refractive index, 1.404.

The aluminum metal aggregate (e.g., LSA-284 by Reynolds) is a granular metal which is typically 90 percent pure aluminum. Other typical properties are: apparent density (grams per cubic centimeter), 1.30; percent retained on U.S. sieve number 100, 97.

The xylene (e.g., Amsco xylene by Union Chemical) is a mixture of aromatic hydrocarbons containing eight carbon atoms. Typical properties are: density (grams per cubic centimeter), 0.871; distillation range (degrees Fahrenheit), 281–287; aniline cloud point (degrees Fahrenheit), 50; and flash point (degrees Fahrenheit in the Tag closed cup), 81.

The aluminum oxide aggregate (e.g., Number 25 by King and Malcolm Co., Inc.) is a coarse mineral which is typically 98 percent aluminum oxide. Other typical properties are: density (grams per cubic centimeter), 3.97; melting point (degrees Celsius), 2015; and solubility in cold water (parts aluminum oxide per million parts water), 98.

The thickening agent (e.g., Bentone SD-2 by NL Industries) is an organic derivative of a montmorillonite clay. It is a finely divided powder which is very light cream in color. Typical properties are: density (pounds per gallon), 13.5; and percent nonvolatile material, 100.

The elastomer-modified epoxy resin (e.g. Kelpoxy G293-100 by Spencer-Kellogg) is an epoxy-terminated elastomeric acrylonitrile-butadiene copolymer. Typical properties are: viscosity (poise), 2000; color (Gardner), 8; weight per gallon (pounds), 8.81; epoxide equivalent weight, 340; and percent nonvolatile, 100.

The garnet aggregate (e.g., 24 RT Garnet Grain by Barton Mines Corporation) is an inert, non-hygroscopic homogeneous natural mineral. It may be described chemically as a ferric aluminum silicate in which some of the iron and aluminum ions have been replaced by calcium, magnesium, or manganese. Typical properties are: hardness (Mohs), 8–9; melting point (degrees Fahrenheit) 2399; density (grams per cubic centimeter), 3.9 to 4.1; and mean refractive index 1.83.

Extensive work on various generic formulations, including Formulas 1, 2 and 3 indicate that formulations comprising, by weight, 3 and 8% amine resins; 7 to 13% epoxy resins; 17 to 22% pigments, fillers and thickeners; 10 to 20% solvents, and 39 to 56% aggregates, are successful.

In the examples involving Formulas 1 and 2, amine resins comprise a first component, and epoxy resins, pigments, fillers, thickeners, solvents and aggregates comprise a second component of each formulation. In the example involving formula 3, amine resins, portions of pigments, portions of thickeners, and portions of solvents comprise a first component; and epoxy resins, portions of pigments, portions of thickeners, portions of solvents, and aggregates comprise a second component of said formulation.

ADVANTAGES AND FEATURES

An advantage of these three compositions in relation to others is their surprising adherence to primed steel after being subjected to impact tests A further advantage of these three compositions is their resistance to wear when laboratory tested in comparison to current nonskid coatings.

Another advantage of these three compositions is their initial high degree of resistance to sliding and their ability to retain this property during and after extended wear.

Formula No. 1 is advantageous because it doesn't cause wear to steel arresting cables on a carrier deck.

Formula No. 2 offers the optimum in resistance to slipping as opposed to the other formulas and variants thereof. Aluminum oxide aggregate has extreme hardness and sharp edges that produces this improvement.

Formula No. 3 is a somewhat more resilient coating which offers a somewhat greater resistance to impact than do the other formulas and variants thereof.

All three formulas and variants thereof incorporate aggregates that add considerably to the long life of each formulation/nonskid coating. As opposed to the formulations without coarse aggretates mentioned in the aforesaid Chemical and Engineering News article, it has been found that aggregates are essential to performance and long life of the formulations, and typically, improvements in excess of 65% are obtained.

Obviously many modifications and variations of the present invention are possible. It is therefore to be understood that within the scope of this invention, the invention may be practiced to several ways, for example:

(a) Part of the liquid epoxy resin in component B may be replaced by solid epoxy resin.

(b) Part of the amidoamine and adducted polyamide amine resins in component A may be replaced by phenalkamine resins, low molecular weight polyfunctional amines, or polyamide resins.

(c) Component A may contain pigments, fillers, thickening or dispersing agents, solvents, and nonskid aggregates and such is the case in Formula No. 3.

(d) All or part of the solvent may be replaced with glycol ethers, xylene, naptha, isobutyl isobutyrate, or other appropriate solvents.

(e) All or part of the aggregate may be replaced by aluminum metal, aluminum oxide, silicon carbide, stainless steel, garnet, glass, or other siliceous aggregates.

(f) Small amounts of other ingredients known in the trade as "additives" may be added to improve the ease of application, ease of manufacture, storage stability, or other properties of the coating.

(g) Fiber fillers may be added to formulation 3 to assist in the formation of a coarse texture when the coating is applied.

(h) The coating may be thinned with a thinner.

What is claimed and desired to be secured by Letters Patent of the United States is:

1. A nonskid coating formulation comprising by weight:
   0.3 to 0.6% of an amidoamine resin of an unsaturated fatty acid and a polyamine, said resin having an amine value from about 580 to about 620 and a Brookfield viscosity from about 10 to about 25 poise;
   5 to 7% of a polyamide/epoxy adduct resin solution of a polyamide from a dimerized fatty acid reacted with a polyamine and the diglycidyl ether of bisphenol A having an amine value and viscosity such that a 75 weight percent solution in n-butyl alcohol has an amine value from about 240 to about 260 and a Brookfield viscosity from about 15 to about 30 poise;
   7 to 13% diglycidyl ether of bisphenol A;
   17 to 22% of pigments;
   10 to 20% of a solvent,; and
   30 to 55% coarse aggregates.

2. A nonskid coating formulation as set forth in claim 1, wherein said amidoamine resin of an unsaturated fatty acid and a polyamine and said polyamide/epoxy adduct resin solution of a polyamide from a dimerized fatty acid reacted with a polyamine and the diglycidyl ether of bisphenol A comprise component A of said formulation; and said diglycidyl ether of bisphenol A, said pigments, said solvent, and said coarse aggregates comprise component B of said formulation.

3. A nonskid coating formulation as set forth in claim 2, wherein said component A is comprised of said amidoamine resin of an unsaturated fatty acid and a polyamine and said polyamide/epoxy adduct resin solution of a polyamide from a dimerized fatty acid reacted with a polyamine and the diglycidyl ether of bisphenol A; and said component B is comprised of the diglycidyl ether of bisphenol A, said pigment comprising talc, titanium dioxide, and carbon black, a solvent, and coarse aggregates.

4. A nonskid coating formulation as set forth in claim 3, wherin said aggregate comprises aluminum metal, aluminum oxide, garnet, silicon carbide, stainless steel, glass, or other siliceous aggregates, either alone or in combination.

5. A nonskid coating formulation as set forth in claim 3 containing 15.0 to 19.0 talc, 0.3 to 2.0% titanium dioxide, and 0.2 to 1.8% carbon black, and containing aluminum metal aggregate as said coarse aggregate.

6. A nonskid coating formulation as set forth in claim 4, wherein said aluminum metal aggregate comprises from 30.0 to 55.0% by weight of said formulation.

7. A nonskid coating formulation as set forth in claim 3, wherein said aggregate is aluminum oxide aggregate.

8. A nonskid coating formulation as set forth in claim 1, wherein said amidoamine resin of an unsaturated fatty acid and a polyamine, said polyamide/epoxy adduct resin solution of a polyamide from a dimerized fatty acid reacted with a polyamine and the diglycidyl ether of bisphenol A, pigments, and solvent comprise component A of said formulation; and said diglycidyl ether of bisphenol A, pigments, solvent, and coarse aggregates comprise component B of said formulation.

9. A nonskid coating formulation as set forth in claim 8 wherein said component A is comprised of said amidoamine resin, said polyamide/epoxy adduct resin solution, talc, titanium dioxide, carbon black, and naphtha; and said component B is comprised of the diglycidyl ether of bisphenol A, an epoxy-terminated elastomeric acrylonitrile-butadiene copolymer resin, talc, titanium dioxide, carbon black, naphtha, and coarse aggregates, said talc, titanium dioxide, and carbon black being pigments.

10. A nonskid coating formulation as set forth in claim 9, wherein said aggregate comprises aluminum oxide aggregate and garnet aggregate.

11. A nonskid coating formulation as set forth in claim 10, wherein said formulation comprises from 3.0 to 7.0% by weight of aluminum oxide aggregate and from 23.0 to 52.0% by weight of garnet aggregate.

12. A nonskid coating formulation as set forth in claim 1, wherein said amidoamine resin, said polyamide/epoxy adduct resin solution of a polyamide from a dimerized fatty acid reacted with a polyamine and the diglycidyl ether of bisphenol A, pigments, and solvent comprise component A of said formulation; and said diglycidyl ether of a bisphenol A, pigments, and solvent comprise component B of said formulations; and coarse aggregates comprise component C of said formulation.

13. A nonskid formulation comprising by weight:
   0.3 to 0.6% of an amidoamine resin of an unsaturated fatty acid and a polyamine, said resin having an amine value from about 580 to about 620 and a Brookfield viscosity from about 10 to about 25 poise
   5.0 to 7.0% of a polyamide/epoxy adduct resin solution of a polyamide from a dimerized fatty acid reacted with a polyamine and the diglycidyl ether of bisphenol A having an amine value and viscosity such that a 75 weight percent solution in n-butyl alcohol has an amine value from about 240 to about 260 and a Brookfield viscosity from about 15 to about 30 poise
   11.0 to 15.0% diglycidyl ether of bisphenol A,
   17.0 to 22.0% pigments, 5.0 to 11.0% naphtha,
0.5 to 6.4% propylene glycol monomethyl ether, and
30.0 to 55.0% aluminum metal aggregate.

14. A nonskid formulation comprising by weight:
0.3 to 0.6% of an amidoamine resin of an unsaturated fatty acid and a polyamine, said resin having an amine value from about 580 to about 620 and a Brookfield viscosity from about 10 to about 25 poise
5.0 to 7.0% of a polyamide from a dimerized fatty acid reacted with a polyamine and the diglycidyl ether of bisphenol A having an amine value and viscosity such that a 75 weight percent solution in n-butyl alcohol has an amine value from about 240 to about 260 and a Brookfield viscosity from about 15 to about 30 poise
11.0 to 15.0% diglycidyl ether of bisphenol A,
17.0 to 22.0% pigments,
5.0 to 11.0% xylene, and
30.0 to 55.0% aluminum oxide aggregate.

15. A nonskid formulation comprising by weight:
0.3 to 6.0% of an amidoamine resin of an unsaturated fatty acid and a polyamine, said resin having an amine value from about 580 to about 620 and a Brookfield viscosity from about 10 to about 25 poise
5.0 to 8.0% of a polyamide/epoxy adduct resin solution of a polyamide from a dimerized fatty acid reacted with a polyamine and the diglycidyl ether of bisphenol A having an amine value and viscosity such that a 75 percent solution in n-butyl alcohol has an amine value from about 240 to about 260 and a Brookfield viscosity from about 15 to about 30 poise
6.8 to 9.2% diglycidyl ether of bisphenol A,
0.7 to 2.4% of an epoxy-terminated elastomeric acrylonitrile-butadiene copolymer resin,
17.0 to 22.0% pigments,
5.0 to 17.0% naphtha,
3.0 to 7.0% aluminum oxide aggregate, and
23.0 to 52.0% garnet aggregate.

16. A nonskid coating formulation as set forth in claim 1, wherein said 17 to 22% pigments include talc, titanium dioxide, carbon black, or any combination of these.

17. A nonskid coating formulation as set forth in claim 13, wherein said 17.0 to 22.0% pigments include 15.0 to 19.0% talc, 0.3 to 2.0% titanium dioxide, and 0.2 to 1.8% carbon black.

18. A nonskid coating formulation as set forth in claim 14, wherein said 17.0 to 22.0% pigments include 15.0 to 19.0% talc, 0.3 to 2.0% titanium dioxide, and 0.2 to 1.8% carbon black.

19. A nonskid coating formulation as set forth in claim 15, wherein said 17.0 to 22.0% pigments include 15.0 to 19.0 talc, 0.3 to 2.0% titanium dioxide, and 0.2 to 1.8% carbon black.

* * * * *